United States Patent
Stetson et al.

(10) Patent No.: US 6,626,323 B2
(45) Date of Patent: Sep. 30, 2003

(54) VANE HEAT TRANSFER STRUCTURE

(75) Inventors: Ned T. Stetson, Lake Orion, MI (US); Michael Marchio, Clarkston, MI (US); Arthur Holland, Commerce Township, MI (US); Daniel Alper, Baltimore, MD (US); David Gorman, Warren, MI (US); Jun Yang, Dearborn, MI (US)

(73) Assignee: Energy Conversion Devices, Inc., Rochester Hills, MI (US)

(*) Notice: Subject to any disclaimer, the term of this patent is extended or adjusted under 35 U.S.C. 154(b) by 0 days.

(21) Appl. No.: 10/080,220

(22) Filed: Feb. 21, 2002

(65) Prior Publication Data
US 2003/0160054 A1 Aug. 28, 2003

(51) Int. Cl.⁷ .................................................. A61F 7/08
(52) U.S. Cl. ...................... 220/577; 206/0.7; 420/900
(58) Field of Search .......................... 220/560.13, 577, 220/581; 206/0.6, 0.7; 165/104.12; 420/900; 96/139

(56) References Cited

U.S. PATENT DOCUMENTS

| | | | | |
|---|---|---|---|---|
| 863,783 A | * | 8/1907 | Chace | 206/0.7 |
| 966,968 A | * | 8/1910 | Watson | 206/0.7 |
| 1,084,116 A | * | 1/1914 | Slick et al. | 206/0.7 |
| 4,134,491 A | * | 1/1979 | Turillon et al. | 206/0.7 |
| 4,457,136 A | * | 7/1984 | Nishizaki et al. | 62/46.2 |
| 4,667,815 A | * | 5/1987 | Halene | 206/0.7 |
| 4,819,718 A | * | 4/1989 | Ishikawa et al. | 165/104.12 |
| 5,766,791 A | * | 6/1998 | Takahashi et al. | 429/57 |
| 6,015,041 A | * | 1/2000 | Heung | 206/70 |
| 6,432,176 B1 | * | 8/2002 | Klos et al. | 96/117.5 |
| 6,446,597 B1 | * | 9/2002 | McAlister | 123/297 |
| 6,471,795 B2 | * | 10/2002 | Kubo et al. | 148/538 |
| 6,517,970 B2 | * | 2/2003 | Ovshinsky et al. | 429/218.2 |

* cited by examiner

Primary Examiner—Stephen K. Cronin
Assistant Examiner—Joseph C. Merek
(74) Attorney, Agent, or Firm—Frederick W. Mau, II; David W. Schumaker; Marvin S. Siskind

(57) ABSTRACT

A hydrogen storage unit which uses hydrogen storage alloys to store hydrogen, and more particularly a heat transfer management/compartmentalization system for use in such system. The hydrogen storage alloy may be divided into compartments, separated by discs, further divided into sub-compartments by a flapper wheel. The discs and flapper wheel provide for optimal heat transfer throughout the system. The compartmentalization of the vessel may prevent compaction of the hydrogen storage alloys, which could lead to excessive strain on the vessel causing damage, deformation, or rupture of the vessel.

23 Claims, 9 Drawing Sheets

VANE HEAT TRANSFER STRUCTURE

FIELD OF THE INVENTION

The present invention relates to hydrogen storage units using hydrideable metal alloys to store hydrogen, and more particularly to a combined heat transfer management/compartmentalization system for use in such systems.

BACKGROUND OF THE INVENTION

In the past considerable attention has been given to the use of hydrogen as a fuel or fuel supplement. While the world's oil reserves are rapidly being depleted, the supply of hydrogen remains virtually unlimited. Hydrogen can be produced from coal, natural gas and other hydrocarbons, or formed by the electrolysis of water. Moreover hydrogen can be produced without the use of fossil fuels, such as by the electrolysis of water using nuclear or solar energy. Furthermore, hydrogen, although presently more expensive than petroleum, is a relatively low cost fuel. Hydrogen has the highest density of energy per unit weight of any chemical fuel and is essentially non-polluting since the main by-product of burning hydrogen is water.

While hydrogen has wide potential application as a fuel, a major drawback in its utilization, especially in mobile uses such as the powering of vehicles, has been the lack of acceptable lightweight hydrogen storage medium. Conventionally, hydrogen has been stored in a pressure-resistant vessel under a high pressure or stored as a cryogenic liquid, being cooled to an extremely low temperature. Storage of hydrogen as a compressed gas involves the use of large and heavy vessels. In a steel vessel or tank of common design only about 1% of the total weight is comprised of hydrogen gas when it is stored in the tank at a typical pressure of 136 atmospheres. In order to obtain equivalent amounts of energy, a container of hydrogen gas weighs about thirty times the weight of a container of gasoline.

Additionally, transportation is very difficult, since the volume of the hydrogen stored in a vessel is limited, due to the low density of hydrogen. Furthermore, storing hydrogen as a liquid presents serious safety problems when used as a fuel for motor vehicles since hydrogen is extremely flammable. Liquid hydrogen must also be kept extremely cold, below −253 degree C., and is highly volatile if spilled. Moreover, liquid hydrogen is expensive to produce and the energy necessary for the liquefaction process is a major fraction of the energy that can be generated by burning the hydrogen.

Alternatively, certain metals and alloys have been known to permit reversible storage and release of hydrogen. In this regard, they have been considered as a superior hydrogen-storage material, due to their high hydrogen-storage efficiency. Storage of hydrogen as a solid hydride can provide a greater volumetric storage density than storage as a compressed gas or a liquid in pressure tanks. Also, hydrogen storage in a solid hydride presents fewer safety problems than those caused by hydrogen stored in containers as a gas or a liquid. Solid-phase metal or alloy system can store large amounts of hydrogen by absorbing hydrogen with a high density and by forming a metal hydride under a specific temperature/pressure or electrochemical conditions, and hydrogen can be released by changing these conditions. Metal hydride systems have the advantage of high-density hydrogen-storage for long periods of time, since they are formed by the insertion of hydrogen atoms to the crystal lattice of a metal. A desirable hydrogen storage material must have a high storage capacity relative to the weight of the material, a suitable desorption temperature/pressure, good kinetics, good reversibility, resistance to poisoning by contaminants including those present in the hydrogen gas and be of a relatively low cost. If the material fails to possess any one of these characteristics it will not be acceptable for wide scale commercial utilization.

Good reversibility is needed to enable the hydrogen storage material to be capable of repeated absorption-desorption cycles without significant loss of its hydrogen storage capabilities. Good kinetics are necessary to enable hydrogen to be absorbed or desorbed in a relatively short period of time. Resistance to contaminants to which the material may be subjected during manufacturing and utilization is required to prevent a degradation of acceptable performance.

Many metal alloys are recognized as having suitability for hydrogen storage in their atomic and crystalline structures as hydride materials. While this storage method holds promise to be ultimately convenient and safe; improvements in efficiency and safety are always welcome. This invention provides such improvement.

It is known that heat transfer capability can enhance or inhibit efficient exchange of hydrogen into and out of metal alloys useful in hydride storage systems. Such transfer is important since metal hydrides, being somewhat analogous to metal oxides, borides, and nitrides ("ceramics") may be considered to be generally insulating materials. Therefore, moving heat within such systems or maintaining preferred temperature profiles across and through volumes of such storage materials becomes of interest in metal alloy-metal hydride hydrogen storage systems. As a general matter, release of hydrogen from the crystal structure of a metal or metal alloy to become a hydride requires input of some level of energy, normally heat. Placement of hydrogen within the crystal structure of a metal, metal alloy, or other storage system generally releases energy, normally heat, providing a highly exothermic reaction of hydriding.

In light of the heat input and heat dissipation needs of such systems, particularly in bulk, and in consideration of the insulating nature of the hydrided material, it is useful to provide means of heat transfer external to the storage material itself. Others have approached this in different ways, such as U.S. Pat. No. 6,015,041 which includes a heat-conductive reticulated open-celled "foam" to place within the hydrided or hydrideable material. The current invention provides for effective heat transfer throughout a hydrogen storage bed without the need for such foam.

Another recognized difficulty with hydride storage materials is that as the storage alloy is hydrided, it will generally expand and the particles of storage material will swell and, often crack. When hydrogen is released, generally on application heat, the storage material or hydrided material will shrink and some particles may collapse. The net effect of the cycle of repeated expansion and contraction of the storage material is comminution of the alloy or hydrided alloy particles into successively finer grains. While this process may be generally beneficial to the enhancement of overall surface area of the alloy or storage material surface area, it creates the possibility that the extremely fine particles may sift through the bulk material and settle toward the lower regions of their container and pack more tightly than is desirable. Forming such a high packing density region within a localized area may lead to localized excessive heating upon hydriding or hydrogen charging. The same highly packed localized high density region may also produce a great amount of strain on the vessel due to the densification and expansion (upon charging) of the hydrogen storage material. The densification and expansion of the hydrogen storage material provide the possibility of deformation or rupture of the container in which the hydrideable material is stored. While pressure relief devices may be useful in preventing such undesired occurrences as the container rupture due to the internal gas pressure of the vessel, pressure relief devices are unable to prevent deformation of the vessel resulting from densification and expansion of the hydrogen storage alloy. Others have approached the problem by dividing the container into simple compartments in a manner that prevents collection of too many fines in a particular compartment while allowing free flow of hydrogen gas throughout the container. The current invention provides for minimization of densification of particulate fines in hydrided or hydrideable materials to prevent the difficulties noted earlier.

SUMMARY OF THE INVENTION

The present invention discloses a hydrogen storage apparatus. The hydrogen storage apparatus provides a rechargeable container to store and release hydrogen. The container may be a pressure containment vessel with an aluminum or aluminum alloy composition. The vessel may be cylindrical in structure and have a restrictive neck. A hydrogen storage alloy, which stores the hydrogen in a hydride form, is contained inside the vessel. A primary partition divides the vessel into multiple compartments. A secondary partition further divides the multiple compartments into sub-compartments. The primary partition and the secondary partition are also configured to transfer thermal energy between the hydrogen storage alloy and the vessel.

The compartments are disposed along the longitudinal axis of the vessel. The primary partition separating the compartments may be in the form of a disc. The primary partition is configured to fit through the restrictive neck of the vessel and spring open once inserted into the vessel. The primary partition generally has a metallic composition. The metallic composition is preferably a copper/beryllium alloy, but a phosphor/bronze alloy may be substituted when dictated by design constraints.

The sub-compartments extend longitudinally throughout each of the compartments. The sub-compartments also extend from the longitudinal axis of the vessel to the inside wall of the vessel. The sub-compartments are at a minimum width at the axis of the vessel and at a maximum width at the inside wall of the vessel.

The secondary partition is made up of multiple rectangular vanes axially connected to one another. The rectangular vanes spiral outward to form a pinwheel type orientation about the longitudinal axis. The secondary partition is configured to fit through the restrictive neck of the vessel and spring open once inserted into the vessel. When the secondary partition springs open, the multiple rectangular vanes come into thermal contact with the inside wall of the vessel. The rectangular vanes tend to have a substantial amount of surface area in contact with the hydrogen storage alloy near the vertical axis of the vessel. The rectangular vanes have a metallic composition with good heat transfer properties. The rectangular vanes are preferably composed of a copper/beryllium alloy, but a phosphor/bronze alloy may be substituted when dictated by design constraints.

The compartments and sub-compartments of the present invention prevent densification of the hydrogen storage alloy inside the vessel. Densification and subsequent expansion of the hydrogen storage alloy (upon charging with hydrogen) can cause strain to the wall of the vessel. The expansion of the compacted hydrogen storage material can lead to vessel damage, deformation and rupture.

The hydrogen storage alloy may be selected from a group including Mg, Mg—Ni, Mg—Cu, Ti—Fe, Ti—Ni, Mm—Co, Ti—Mn, Mm—Ni, and mixtures thereof. A preferable alloy is Ti—Mn, which has excellent room temperature kinetics and plateau pressures.

The vessel disclosed in the present invention may have a restrictive neck forming an opening to the vessel. A porous fiber material is placed below the restrictive neck to secure placement of said hydrogen storage alloy. The porous fiber may also help prevent metal hydride from exiting the vessel with the exiting hydrogen stream. The porous fiber is preferably glass wool.

DETAILED DESCRIPTION OF THE DRAWINGS

This invention applies compartmentalization of the hydride bed within a pressure containment vessel to reduce hydride fines settlement and packing and improve heat transfer from the interior of the hydride bed to the exterior environment. Improvement is made by sub-compartmentalization within the compartments to further minimize the movement of alloy or hydride fines into accumulations sufficient to cause excessive localized stress conditions which may lead to container, generally vessel, damage, deformation, or rupture. The sub-compartmentalization may be accomplished in numerous ways with the goal being to segregate smaller volumes of the hydrogen storage alloy thereby limiting the travel, and subsequent settling or accumulation, of the fines which can be expected to be generated within the material through normal use with repetitive charge/discharge cycling. This must be accomplished while retaining free gas flow of the stored hydrogen, tolerances of compartmentalization must be close enough to minimize flow of particulate fines yet maintain gas flow sufficient to meet requirements of devices in gas-flow communication with the hydride bed container such as fuel cells, engines, recharging devices, cooking grilles, as well as other users and suppliers of hydrogen from the absorbed hydrogen bed container.

This invention includes not only sub-compartmentalization beyond the container compartments, but also employs highly heat conductive materials within the hydride bed for enhancement and management of the heat transfer within the system. The low thermal conductivity of the hydrogen storage alloy makes it necessary to enhance the heat transfer through the hydrogen storage alloy. Since heat is added and removed through the outer walls of the vessel, there must also be good thermal contact between the hydrogen storage alloy and the cylindrical wall of the vessel. In meeting both the need to prevent material densification and the need for additional heat transfer, the present invention involves creating sub-compartments within the vessel using materials having good heat-transfer characteristics. In this manner, heat transfer to assist in efficient charging and discharging of hydrogen to and from the storage material and storage bed generally is enhanced and compartmentalization is effectively accomplished. This invention preferably employs materials having preferred thermal conductivity as the compartment dividers, generally, the preference will be for dividers of high thermal conductivity but in some circumstances low or variable thermal conductivity across the hydride bed will serve beneficially.

Figure 1:
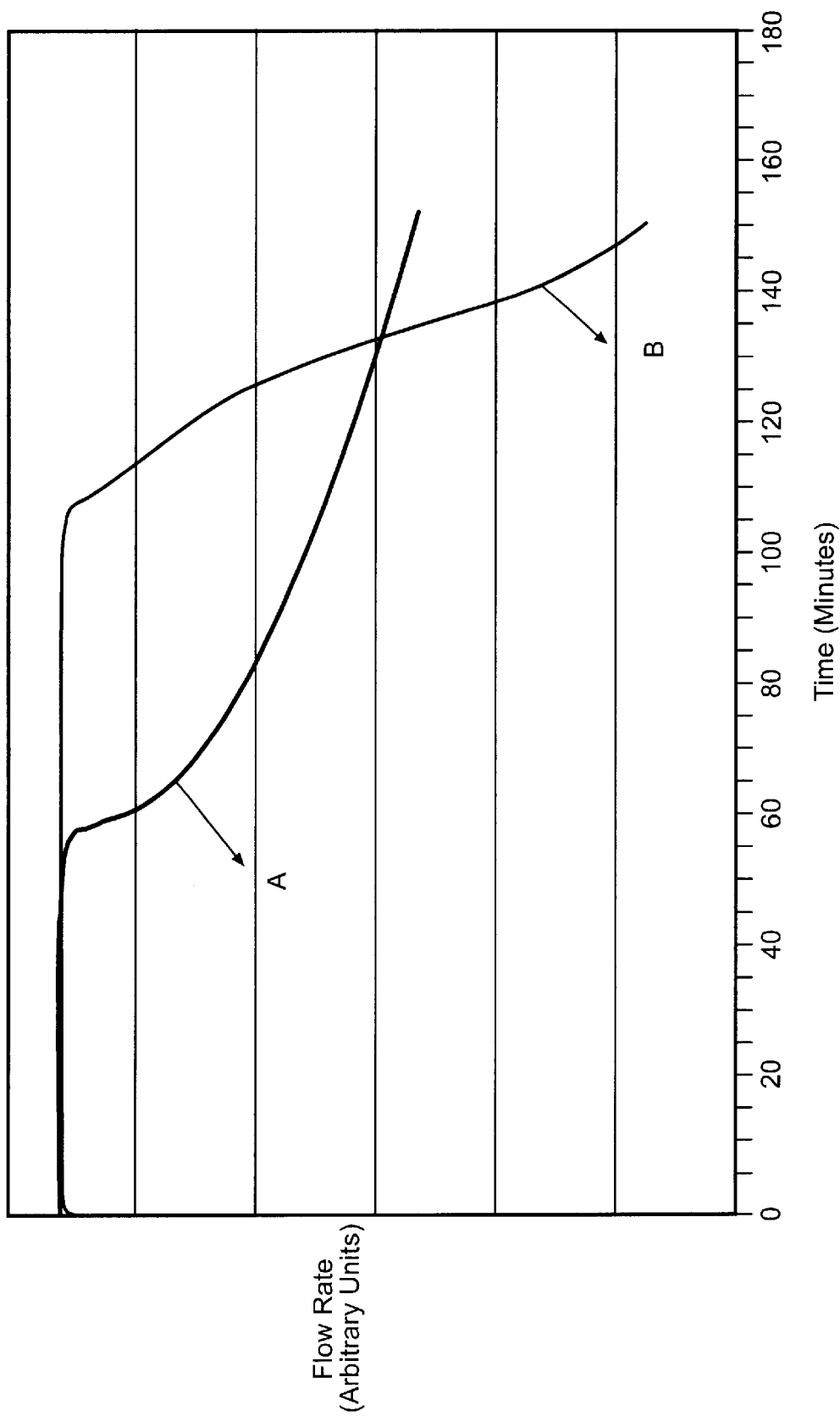
FIG. 1, is a graph showing the flow of hydrogen with respect to time.

The improved hydrogen flow rate over time obtained due to improved internal heat transfer within vessels containing hydrogen storage alloys is shown in FIG. 1. FIG. 1 compares a vessel without the improved heat transfer (A) to a vessel with improved internal heat transfer (B). The average air temperature surounding the vessels compared in FIG. 1 is in the range of 50–52° C. Vessels containing hydrided hydrogen storage alloy are able to provide an improved hydrogen flow rate with the improved internal heat transfer. As a result of the improved internal heat transfer, nearly all of the hydrogen stored in the hydrogen storage material can be retrieved before the hydrogen flow rate begins to diminish.

Figure 2:
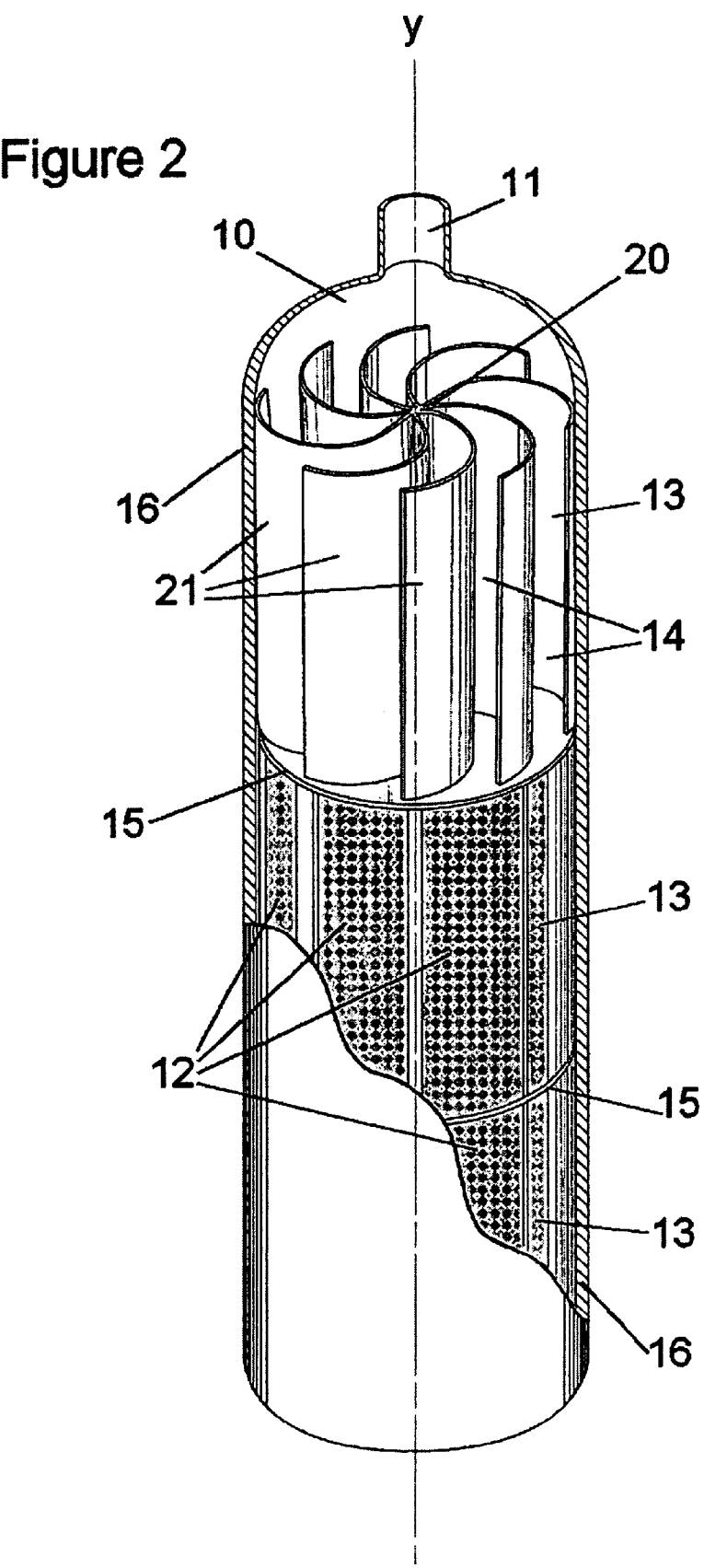
FIG. 2, is a depiction of a preferred embodiment of the present invention.

Shown in FIG. 2 is a preferred embodiment of the present invention. The present invention provides for storage of hydrogen within a preformed cast pressure containment vessel 10 having a restricted neck 11, however a wide variety of vessels or containers may be used in accordance with the present invention. The pressure containment vessel 10 may be cylindrical with a longitudinal axis y. The vessel may generally be formed of aluminum and alloys thereof.

The hydrogen storage alloy 12 is contained in a plurality of longitudinally positioned compartments 13 inside the pressure containment vessel 10. The compartments 13 are divided into sub-compartments 14, further segregating the volumes of the hydrogen storage alloy 12.

Discs 15 are used to separate the longitudinally positioned compartments 13. The discs 15 are configured to fit through the restricted neck 11 of the vessel 10 and spring open and contact the inside wall 16 of the vessel 10 once inside. The discs 15 should be made from a thermally conductive material. The material must not be reactive with the stored hydrogen or the hydrogen storage alloy and be able to withstand the operating temperatures of the system. The discs 15 are preferably formed from a beryllium/copper alloy, for optimal heat transfer, but other metals may be substituted such as phosphor/bronze alloys, if cost considerations warrant such a substitution.

Figure 3:
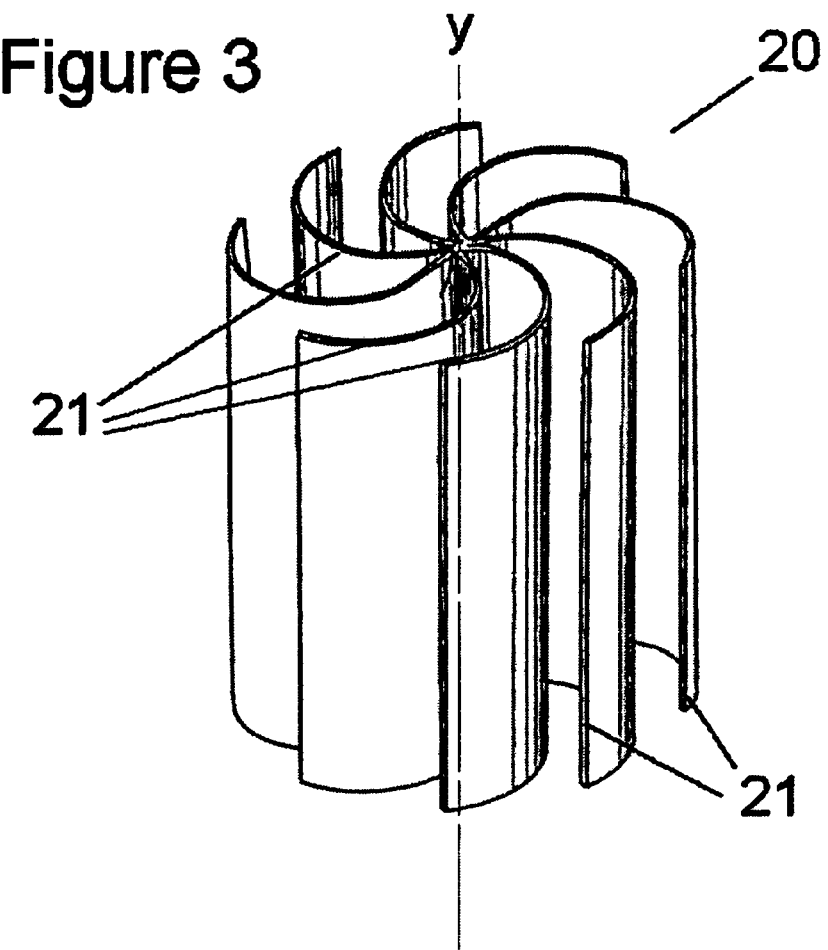
FIG. 3, is a depiction of the flapper wheel in accordance with the present invention.
Figure 4:
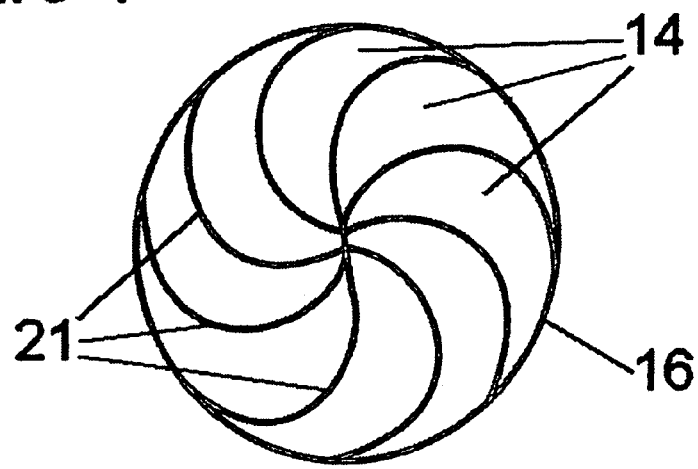
FIG. 4, shows a cross-sectional view of the flapper wheel as used in accordance with the present invention.

A flapper wheel shaped structure is shown in FIG. 3. The flapper wheel 20 comprises a plurality of axially connected rectangular metallic vanes 21 having a pinwheel type orientation about the longitudinal axis y of the vessel. By adjusting the length, thickness, and temper of the vanes 21, the shape of the spiral can be controlled. The vanes 21 can thus be maintained at near constant spacing to avoid any portion of the hydrogen storage alloy 12 from being thermally isolated. A cross-sectional view of the flapper wheel positioned in the pressure containment vessel 10 is shown in FIG. 4. The flapper wheel 20 is used to divide the compartments 13 into sub-compartments 14. When placed inside the vessel, the vanes 21 form a plurality of longitudinal sub-compartments 14 parallel with the longitudinal axis y of the vessel 10, extending throughout each compartment 13. Each sub-compartment 14 is most narrow at the longitudinal axis y of the vessel 10 and is widest near the inside wall 16 of the vessel 10. The metallic vanes 21 must be long enough, and thin enough to spring back to a shape and size where they make firm contact with the inside wall of the vessel 10 upon insertion, thereby providing good thermal contact with the inside wall 16 of the vessel 10. Other reasons for minimizing the thickness of the vanes is to maximize the volume of hydrogen storage alloy within the vessel and reduce the overall cost of the storage unit.

The flapper wheel 20 provides optimal heat transfer throughout the vessel 10 and prevents compression of the hydride fines within the vessel 10. As with the discs 15 described above, the flapper wheel 20 is constructed from thermally conductive material to optimize heat transfer throughout the system. The material must also not be reactive with the stored hydrogen or the hydrogen storage alloy and be able to withstand the operating temperatures of the system. The flapper wheel 20 is preferably formed from a beryllium/copper alloy composition, for optimal heat transfer, but again, other metals may be substituted such as a phosphor/bronze alloy.

The pinwheel shape and design of the flapper wheel 20 provide for optimal heat transfer between the metal vanes 21 and the inside wall 16 of the vessel 10 and between the metal vanes 21 and the hydrogen storage alloy 12. Due to the pinwheel configuration, the metal vanes 21 have a substantial amount of surface area in contact with the hydrogen storage alloy 12, especially near the longitudinal axis y of the pressure containment vessel 10. The pinwheel configuration may also provide a substantial amount of surface area in contact with the inside wall 16 of the vessel 10 when the vanes 21 are in tangential contact with the inside wall 16 of the vessel 10. Overall, the pinwheel design provides much more surface area as compared to other designs such as metallic bristles extending from the longitudinal axis of the vessel to the interior wall of the vessel. The heat transferred through the flapper wheel 20 provides a near homogeneous temperature throughout the vessel thereby preventing "dead" portions of the hydrogen storage alloy 12 which are so isolated thermally that they are ineffective in absorbing or releasing hydrogen.

Figure 10:
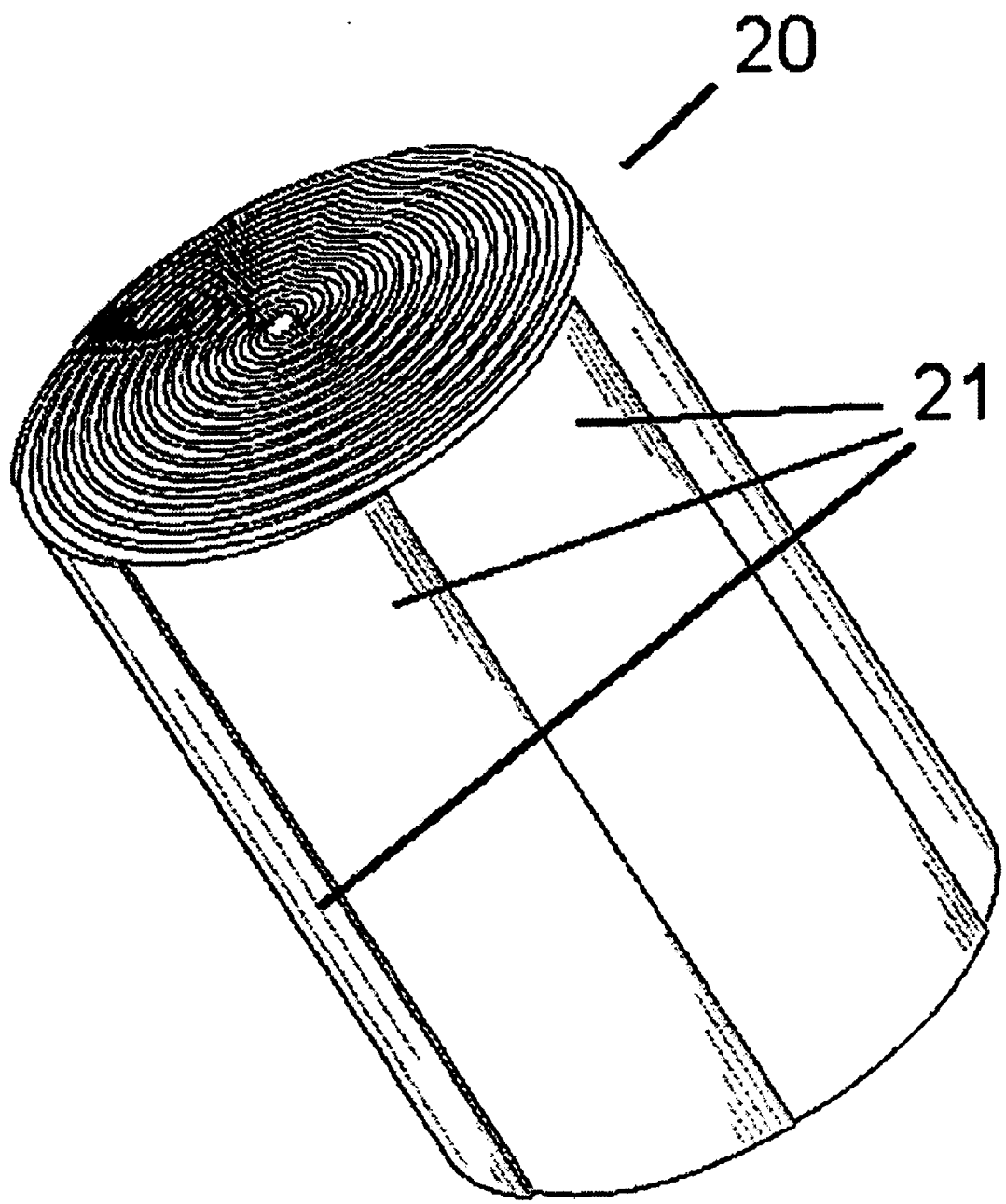
FIG. 10, is a depiction of the flapper wheel in accordance with the present invention with the metallic vanes being tightly rolled together.

The shape of the flapper wheel 20 allows for easy insertion into cast formed vessels having a restrictive neck, which is an opening smaller in diameter than the diameter of the storage vessel. Prior to insertion into the vessel, the flapper wheel 20 is tightly rolled, thereby reducing the diameter of the flapper wheel. A tightly rolled flapper wheel with a reduced diameter ready for insertion into a restrictive neck of a pressure containment vessel is depicted in FIG. 10. The flapper wheel is then inserted through the restrictive neck 11 of the vessel 10. Upon placement into the vessel, the flapper wheel springs open and makes firm contact with the inside wall 16 of the vessel 10. The hydrogen storage alloy is then inserted into the compartments of the flapper wheel 20 and a disk 15 is placed on top to finalize the formation of a compartment 13. The process is then repeated until the vessel is full. Once the vessel is full, glass wool, or another porous fiber may be placed between the vessel opening and the last compartment to prevent any of the hydride fines from exiting the vessel while allowing passage of the hydrogen into and out of the vessel. The glass wool or porous fiber also acts to help hold the contents of the vessel in place.

The hydrogen storage alloy may include a variety of metallic materials for hydrogen-storage, e.g., Mg, Mg—Ni, Mg—Cu, Ti—Fe, Ti—Ni, Mm—Co, Ti—Mn, and Mm—Ni alloy systems (wherein, Mm is Misch metal, which is a rare-earth metal or combination/alloy of rare-earth metals).

Of these materials, the Mg alloy systems can store relatively large amounts of hydrogen per unit weight of the storage material. However, heat energy must be supplied to release the hydrogen stored in the alloy, because of its low hydrogen dissociation equilibrium pressure at room temperature. Moreover, release of hydrogen can be made, only at a high temperature of over 250° C. along with the consumption of large amounts of energy.

The rare-earth (Misch metal) alloys have their own problems. Although they typically can efficiently absorb and release hydrogen at room temperature, based on the fact that it has a hydrogen dissociation equilibrium pressure on the order of several atmospheres at room temperature, their hydrogen-storage capacity per unit weight is lower than any other hydrogen-storage material and they are very expensive.

The Ti—Fe alloy system, which has been considered as a typical and superior material of the titanium alloy systems, has the advantages that it is relatively inexpensive and the hydrogen dissociation equilibrium pressure of hydrogen is several atmospheres at room temperature. However, since it requires a high temperature of about 350° C. and a high pressure of over 30 atmospheres for initial hydrogenation, the alloy system provides relatively low hydrogen absorption/desorption rate. Also, it has a hysteresis problem which hinders the complete release of hydrogen stored therein.

Since the present invention is designed for use at room temperature, the hydrogen storage alloy for the present invention is preferably a Ti—Mn alloy. This alloy has excellent room temperature kinetics and plateau pressures. The Ti—Mn alloy system has been reported to have a high hydrogen-storage efficiency and a proper hydrogen dissociation equilibrium pressure, since it has a high affinity for hydrogen and low atomic weight to allow large amounts of hydrogen-storage per unit weight.

A generic formula for the Ti—Mn alloy is: $Ti_{Q-X}Zr_XMn_{Z-Y}A_Y$, where A is generally one or more of V, Cr, Fe, Ni and Al. Most preferably A is one or more of V, Cr, and Fe. The subscript Q is preferably between 0.9 and 1.1, and most preferably Q is 1.0. The subscript X is between 0.0 and 0.35, more preferably X is between 0.1 and 0.2, and most preferably X is between 0.1 and 0.15. The subscript Y is preferably between 0.3 and 1.8, more preferably Y is between 0.6 and 1.2, and most preferably Y is between 0.6 and 1.0. The subscript Z is preferably between 1.8 and 2.1, and most preferably Z is between 1.8 and 2.0. The alloys are generally single phase materials, exhibiting a hexagonal Laves phase crystalline structure. Preferred alloys are shown in Table 1.

Figure 5:
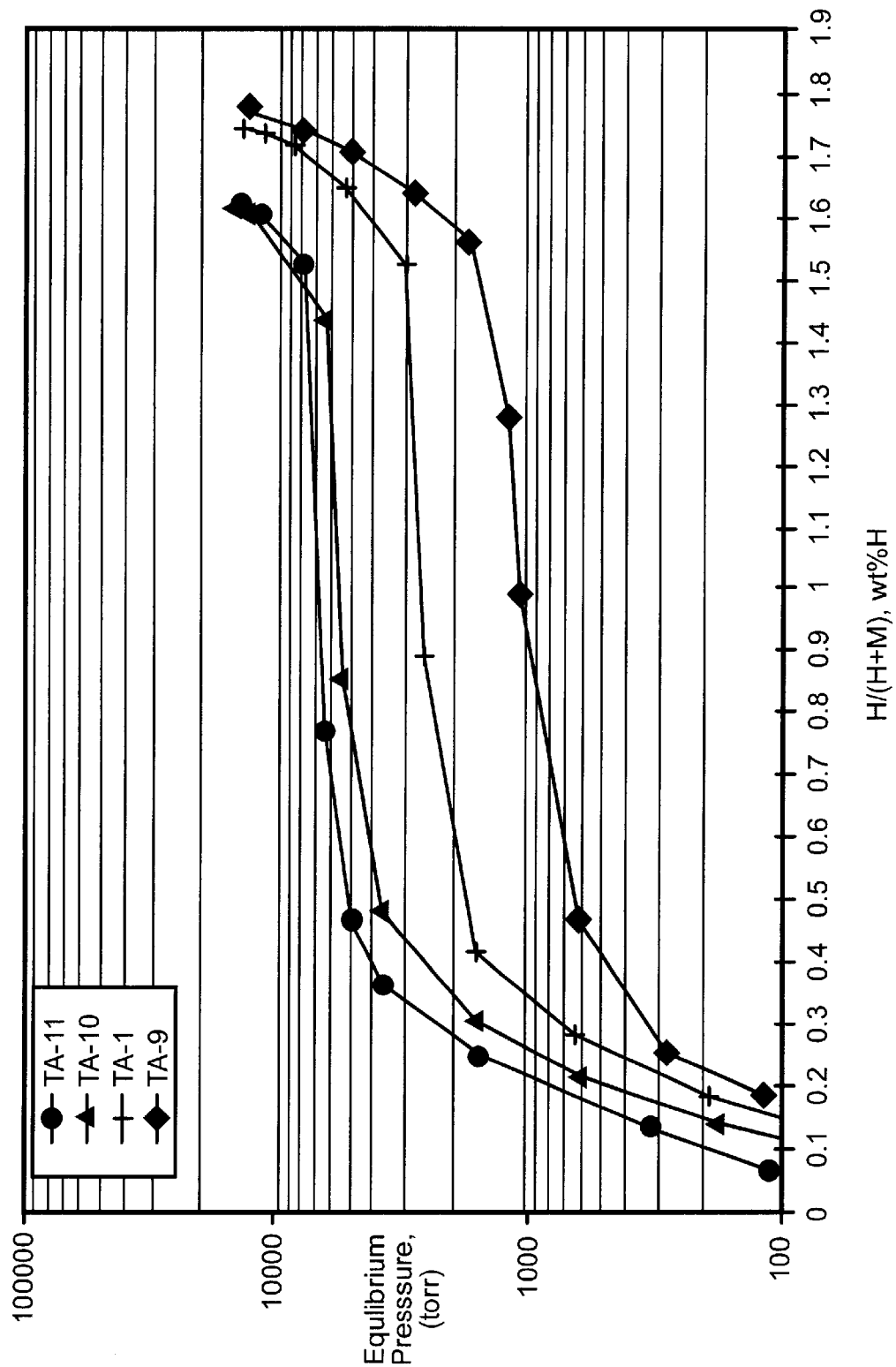
FIG. 5, shows the PCT curves for hydrogen storage alloys TA-1, TA-9, TA-10 and TA-11 at 30° C.
Figure 6:
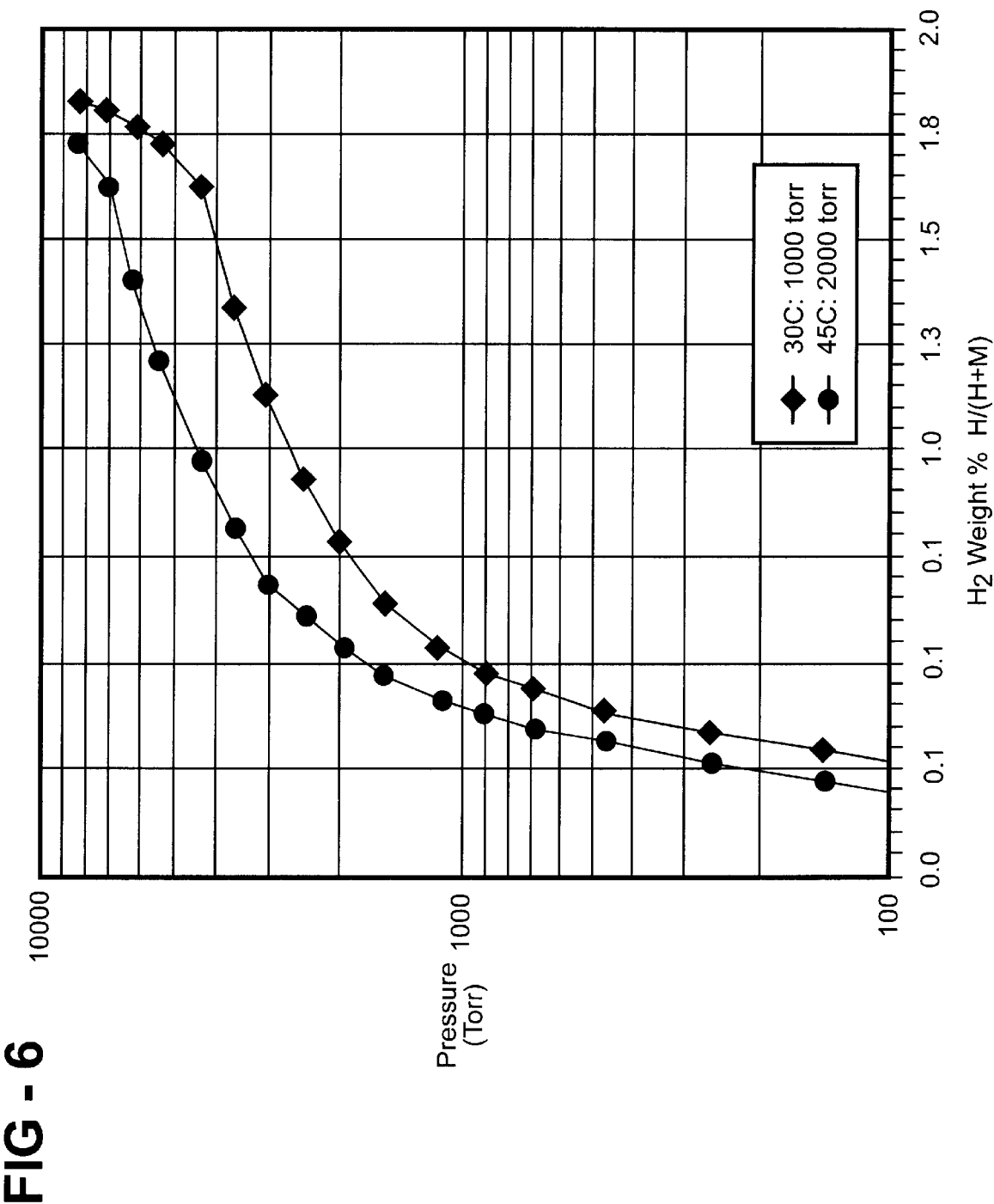
FIG. 6 is a PCT graph of hydrogen storage alloy TA-34 at 30° C. and 45° C.
Figure 7:
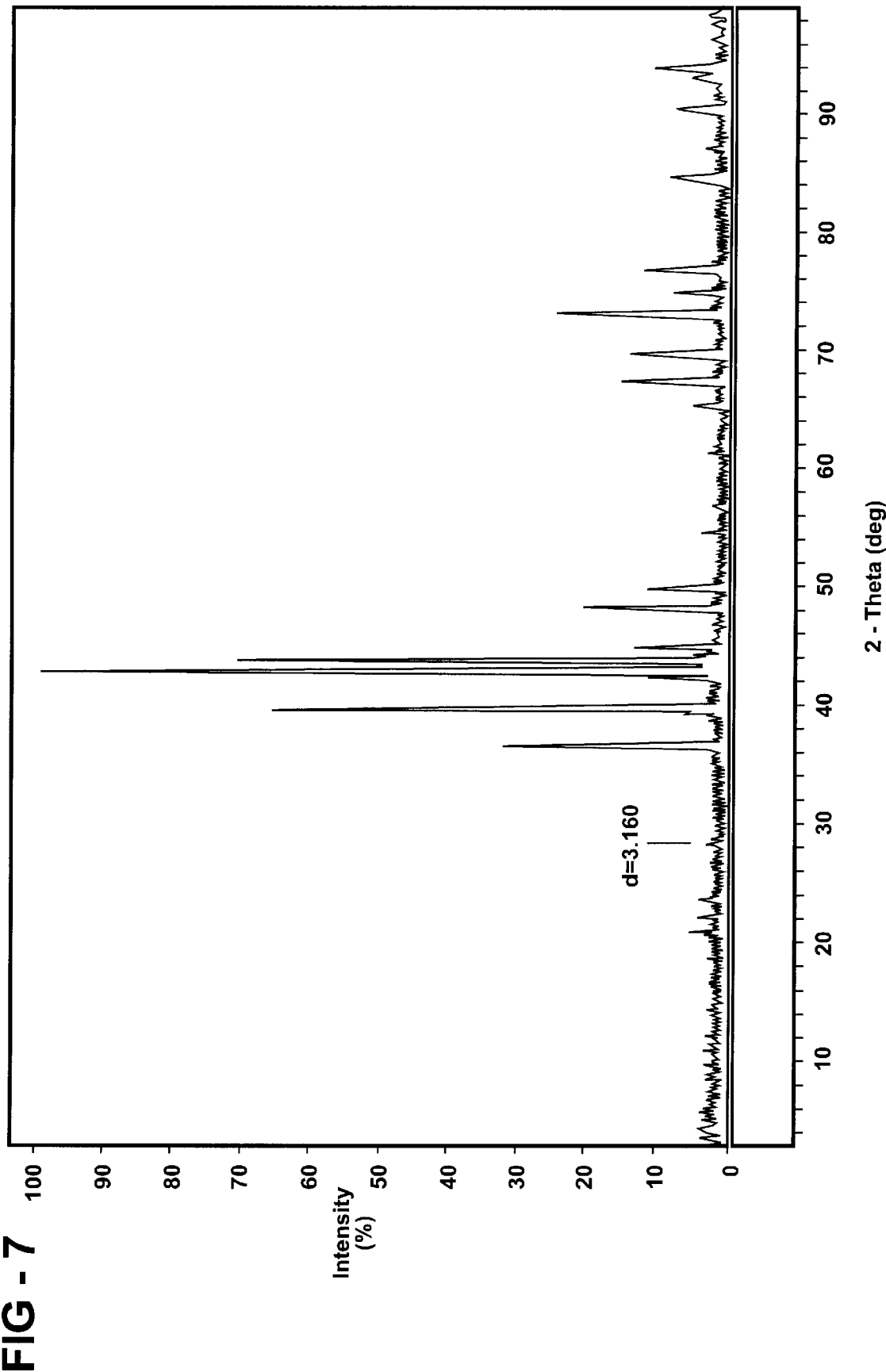
FIG. 7 is an X-ray diffraction (XRD) analysis of hydrogen storage alloy TA-34.

These alloys have average storage capacity, ranging from 1 to 2 weight percent. They also have excellent room temperature kinetics. FIG. 5, is a Pressure-Composition-Temperature (PCT) graph for several of the alloys of the instant invention plotting pressure in Torr on the y-axis versus weight percent of stored hydrogen on the x-axis. Specifically shown are the desorption PCT curves for TA-1, TA-9, TA-10 and TA-11 at 30° C. FIG. 6 is a PCT graph of TA-34 at 30° C. (the ♦ symbol) and 45° C. (the ● symbol) plotting pressure in Torr on the y-axis versus weight percent of stored hydrogen on the x-axis. As can be seen, these alloys have very good plateau pressures at room temperature. The plateau pressures at 30° C., the maximum storage capacity and the reversible storage capacity (also at at 30° C.) of most of the alloys of Table 1 are shown in Table 2. It should be noted that alloys TA-34, TA-35, TA-56 and TA-56D are lower cost alloys which have reduced V and Cr content and can be made using commercially available ferrovanadium and ferrochromium alloys. FIG. 7 is an X-ray diffraction (XRD) analysis of alloy TA-34. As can be seen analysis of the XRD plot, the alloys of the instant invention have a hexagonal $C_{14}$ Laves phase crystalline structure.

Figure 8:
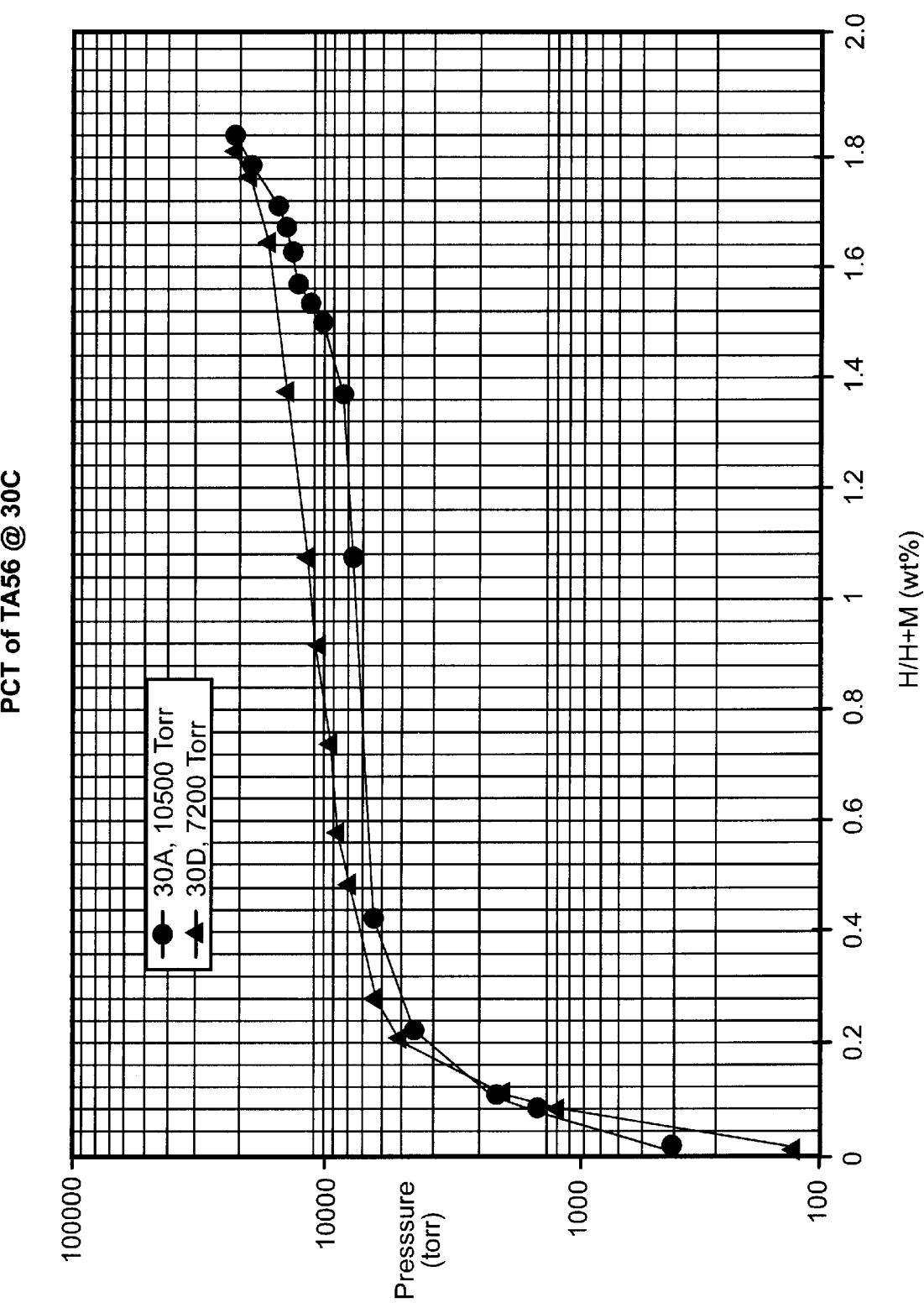
FIG. 8 is a PCT graph of hydrogen storage alloy TA-56 at 30° C.
Figure 9:
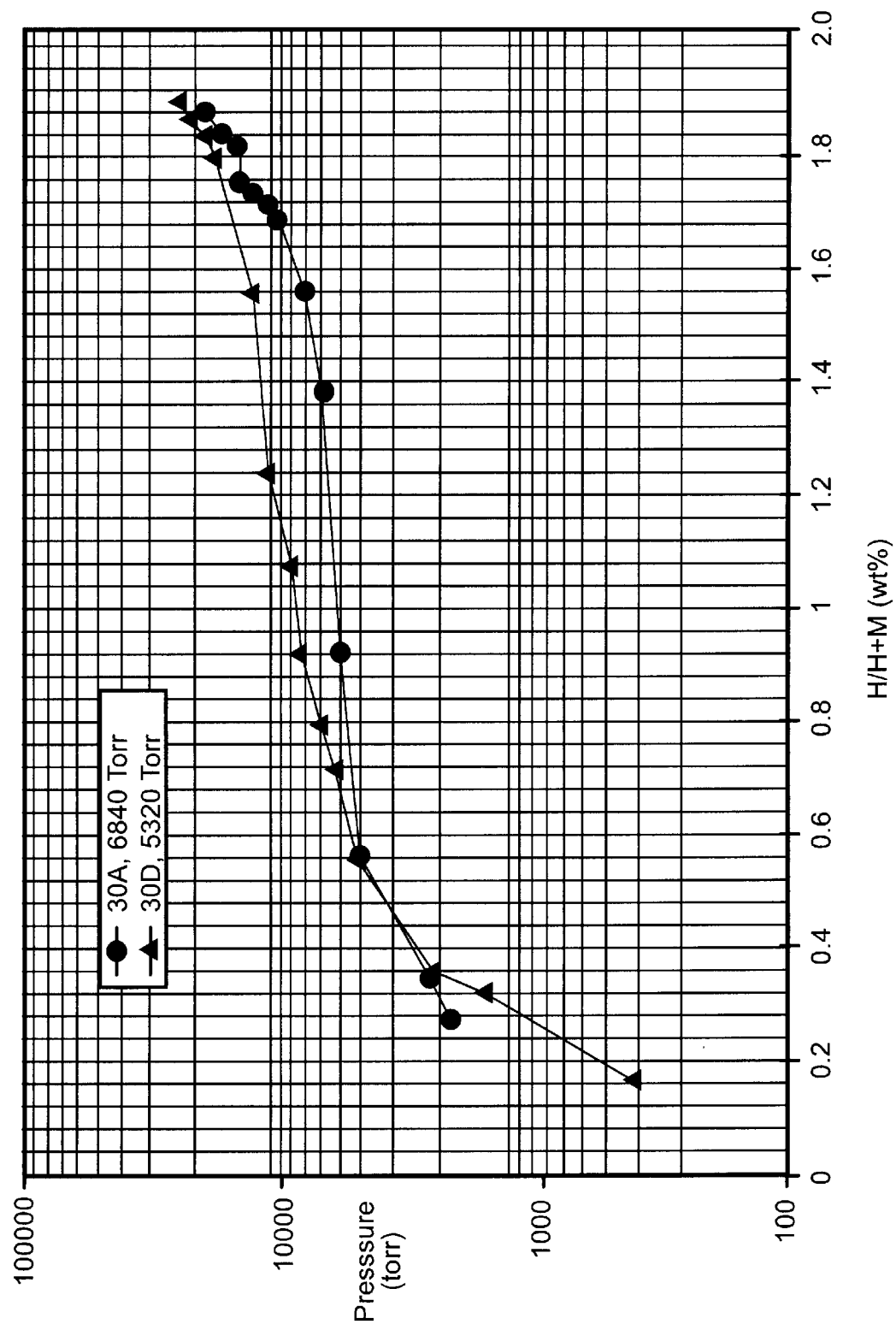
FIG. 9 is a PCT graph of hydrogen storage alloy TA-56D at 30° C.

FIG. 8 is a PCT graph of TA-56 at 30° C. (absorption is solid line, desorption is the dashed line) plotting pressure in Bar on the y-axis versus weight percent of stored hydrogen on the x-axis. FIG. 9 is a PCT graph of TA-56D at 30° C. (absorption is the dashed line, desorption is the solid line) plotting pressure in Bar on the y-axis versus weight percent of stored hydrogen on the x-axis. More detailed information regarding the Ti—Mn alloy can be found in commonly assigned copending application Ser. No. 09/998,277 filed on Nov. 30, 2001, the disclosure of which is herein incorporated by reference.

TABLE 1

| Alloy # | Ti | Zr | V | Cr | Mn | Fe | Ni | Al |
|---|---|---|---|---|---|---|---|---|
| TA-1 | 0.9 | 0.1 | 0.45 | — | 1.3 | — | 0.26 | — |
| TA-2 | 0.8 | 0.2 | 0.4 | 0.3 | 1.25 | 0.06 | — | — |
| TA-4 | 0.8 | 0.2 | 0.4 | — | 1.25 | 0.36 | — | — |
| TA-5 | 0.7 | 0.3 | 0.3 | — | 1.5 | — | 0.17 | — |
| TA-9 | 0.8 | 0.2 | 0.45 | — | 1.3 | — | 0.26 | — |
| TA-10 | 0.95 | 0.05 | 0.45 | — | 1.3 | — | 0.26 | — |
| TA-11 | 0.9 | 0.1 | 0.3 | 0.25 | 1.28 | — | 0.17 | — |
| TA-12 | 0.8 | 0.2 | 0.25 | 0.3 | 1.31 | — | 0.14 | — |
| TA-16 | 0.9 | 0.1 | 0.2 | 1.08 | 0.6 | — | 0.12 | — |
| TA-23 | 0.8 | 0.2 | 0.25 | 0.30 | 1.31 | 0.14 | — | — |
| TA-34 | 0.84 | 0.15 | 0.25 | 0.18 | 1.28 | 0.25 | — | 0.06 |
| TA-35 | 0.85 | 0.15 | 0.03 | — | 1.5 | 0.23 | — | 0.06 |
| TA-56 | 0.87 | 0.13 | 0.17 | 0.18 | 1.29 | 0.24 | — | 0.06 |
| TA-56D | 0.87 | 0.13 | 0.16 | 0.17 | 1.23 | 0.23 | — | 0.06 |

TABLE 2

| Alloy | Max % H$_2$ Conc. (H/(H + M)) | Rev. % H$_2$ Conc. (H/(H + M)) | Plateau Pressure (Torr) |
|---|---|---|---|
| TA-1 | 1.84 | 1.6 | 2400 |
| TA-2 | >1.57 | 1.6 | 1130 |
| TA-4 | >1.56 | 1.6 | 3030 |
| TA-5 | 1.83 | 1.5 | 660 |
| TA-9 | >1.55 | 1.6 | 1180 |
| TA-10 | 2.0 | 1.6 | 5590 |
| TA-11 | 1.78 | 1.5 | 7000 |
| TA-12 | 1.9 | 1.72 | 2500 |
| TA-16 | 1.75 | 1.19 | 5000 |
| TA-23 | 1.99 | 1.71 | 1300 |
| TA-34 | 1.87 | 1.55 | 1600 |
| TA-56 | 1.84 | 1.7 | 7200 |
| TA-56D | 1.9 | 1.68 | 5700 |

The foregoing is provided for purposes of explaining and disclosing preferred embodiments of the present invention. Modifications and adaptations to the described embodiments, particularly involving changes to the shape of the vessel, the type of hydrogen storage alloy, the shape and design of the compartments within the storage vessel, and the shape and design of the partitions, will be apparent to those skilled in the art. These changes and others may be made without departing from the scope or spirit of the invention in the following claims.

We claim:

1. Apparatus for storing hydrogen storage material under pressure, said apparatus comprising:
   a pressure containment vessel defining an interior volume and having a longitudinal axis;
   a hydrogen storage alloy occupying at least a portion of the interior volume of said vessel;
   at least one primary partition adapted to divide said vessel into a plurality of compartments; and
   at least one secondary partition adapted to divide at least one of said plurality of compartments into a plurality of sub-compartments into which said hydrogen storage alloy is disposed;
   said secondary partition comprising a plurality of vanes axially connected to one another wherein said plurality of vanes spiral outward to form a pinwheel orientation about said longitudinal axis of said vessel;
   said secondary partition being formed of a thermally conductive material whereby heat is transferred between said hydrogen storage alloy and said vessel.

2. The apparatus according to claim 1, wherein said plurality of compartments are disposed along said longitudinal axis of said vessel.

3. The apparatus according to claim 2, wherein said sub-compartments extend longitudinally throughout each of said plurality of compartments.

4. The apparatus according to claim 3, wherein each of said sub-compartments extend from the longitudinal axis of said vessel to the inside wall of said vessel.

5. The apparatus according to claim 4, wherein said sub-compartments are at a minimum width at the longitudinal axis of said vessel and at a maximum width at the inside wall of said vessel.

6. The apparatus according to claim 1, wherein said primary partition comprises a disc.

7. The apparatus according to claim 6, wherein said disc has thermal contact with the inside wall of said vessel.

8. The apparatus according to claim 7, wherein said disc has a metallic composition.

9. The apparatus according to claim 8, wherein said disc is comprised of a copper/beryllium alloy.

10. The apparatus according to claim 8, wherein said disc is comprised of a phosphor/bronze alloy.

11. The apparatus according to claim 1, wherein said plurality of vanes have thermal contact with the inside wall of said vessel.

12. The apparatus according to claim 11, wherein said plurality of vanes have a metallic composition.

13. The apparatus according to claim 12, wherein said plurality of vanes are comprised of a copper/beryllium alloy.

14. The apparatus according to claim 12, wherein said plurality of vanes are comprised of a phosphor/bronze alloy.

15. The apparatus according to claim 1, wherein said plurality of vanes have a substantial amount of surface area in contact with said hydrogen storage alloy near the longitudinal axis of said vessel.

16. The apparatus according to claim 1, wherein said hydrogen storage alloy is selected from a group consisting of Mg, Mg—Ni, Mg—Cu, Ti—Fe, Ti—Ni, Mm—Co, Ti—Mn, Mg—Ni—Co—Mn and Mm—Ni, and mixtures thereof.

17. The apparatus according to claim 16, wherein said hydrogen storage alloy comprises a Ti—Mn based alloy.

18. The apparatus according to claim 17, wherein said hydrogen storage alloy has the formula $Ti_{Q-X}Zr_XMn_{Z-Y}A_Y$,
   wherein A is one or more elements selected from the group consisting of V, Cr, Fe, Ni, and Al;
   Q is between 0.9 and 1.1
   X is between 0.0 and 0.35
   Y is between 0.3 and 1.8, and
   Z is between 1.8 and 2.1.

19. The hydrogen storage alloy of claim 18, wherein said alloy comprises $Ti_{0.87}Zr_{0.13}Mn_{1.29}V_{0.17}Cr_{0.18}Fe_{0.24}Al_{0.06}$.

20. The hydrogen storage alloy of claim 18, wherein said alloy comprises $Ti_{0.87}Zr_{0.13}Mn_{1.23}V_{0.16}Cr_{0.17}Fe_{0.23}Al_{0.06}$.

21. The apparatus according to claim 1, wherein said vessel has a restrictive neck forming an opening to said vessel.

22. The apparatus according to claim 21, wherein said secondary partition is configured to fit through said restrictive neck of said vessel.

23. The apparatus according to claim 1, wherein said vessel is comprised of an aluminum alloy.

* * * * *